(12) United States Patent
Bhupalam et al.

(10) Patent No.: US 12,199,948 B2
(45) Date of Patent: Jan. 14, 2025

(54) INTELLIGENT DEPLOYMENT REGION SELECTION AND SCALING OF CLOUD-BASED FIREWALLS

(71) Applicant: Palo Alto Networks, Inc., Santa Clara, CA (US)

(72) Inventors: Bhaskar Bhupalam, Fremont, CA (US); Gino John, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 388 days.

(21) Appl. No.: 17/449,843

(22) Filed: Oct. 4, 2021

(65) Prior Publication Data

US 2023/0108139 A1 Apr. 6, 2023

(51) Int. Cl.
*H04L 9/40* (2022.01)
*H04L 61/4511* (2022.01)
*H04L 67/10* (2022.01)

(52) U.S. Cl.
CPC ...... *H04L 63/0209* (2013.01); *H04L 61/4511* (2022.05); *H04L 67/10* (2013.01)

(58) Field of Classification Search
CPC . H04L 63/0209; H04L 61/4511; H04L 67/10; H04L 61/5076; H04L 63/0227
USPC .......................................................... 706/11
See application file for complete search history.

(56) References Cited

U.S. PATENT DOCUMENTS

| | | | |
|---|---|---|---|
| 9,547,534 B2 | 1/2017 | Dettori et al. | |
| 2002/0035639 A1* | 3/2002 | Xu | H04L 67/10 709/230 |
| 2005/0183139 A1* | 8/2005 | Goddard | H04L 67/1001 726/11 |
| 2010/0046531 A1* | 2/2010 | Louati | H04L 45/00 370/401 |
| 2014/0259094 A1* | 9/2014 | Narayanaswamy | H04L 63/1425 726/1 |
| 2017/0220372 A1* | 8/2017 | Masters | G06F 9/4868 |

OTHER PUBLICATIONS

EP Application No. 22198450.3, Extended European Search Report mailed Jan. 25, 2023, 9 pages.

(Continued)

*Primary Examiner* — Tan Doan
(74) *Attorney, Agent, or Firm* — Gilliam IP PLLC (57) ABSTRACT

Automated, intelligent selection of regions for cloud-based firewall deployment and scaling of firewalls down to as few as zero in a cloud region is described herein. The service collects and evaluates Usage metrics pertaining to firewalls deployed in each region are collected and evaluated to determine whether to scale firewalls in a region up or down. Scaling down of firewalls to zero is conditioned on at least one other region having a firewall(s) available for traffic inspection such that the number of total firewalls available for inspection of network traffic is at least one at any given time. When scaling up through deployment of additional firewalls, if endpoint devices located near a region in which a firewall is not available contribute substantially to firewall usage in another region, the region nearest to those endpoint devices is determined and selected for deployment of the additional firewalls.

20 Claims, 8 Drawing Sheets

(56) References Cited

OTHER PUBLICATIONS

Barracuda Networks, et al., "AWS Reference Architecture—CloudGen Firewall Auto Scaling Cluster", [online], [retrieved on Feb. 14, 2022] Retrieved from the Internet: <https://campus.barracuda.com/product/cloudgenfirewall/doc/79462692/aws-reference-architecture-cloudgen-firewall-auto-scaling-cluster/>, Nov. 5, 2019.
Salah, et al., "Analytical Model for Elastic Scaling of Cloud-Based Firewalls", IEEE, Transactions on Network and Service Management, vol. 14, Issue: 1, Dec. 15, 2016, 11 pages.

* cited by examiner

INTELLIGENT DEPLOYMENT REGION SELECTION AND SCALING OF CLOUD-BASED FIREWALLS

BACKGROUND

The disclosure generally relates to transmission of digital information and to network architectures or network communication protocols for network security.

Firewall-as-a-service (FWaaS) solutions have become increasingly common offerings by security vendors as more applications move into the cloud. Firewalls provided with FWaaS solutions differ from traditional firewalls in that they are delivered as cloud-based services. FWaaS supports establishment and configuration of "fleets" of firewalls comprising more than one cloud-based firewall (hereinafter simply "firewall"), where network traffic is load balanced across the fleet of firewalls for inspection. Scaling up can be achieved through instantiation of additional firewalls in a fleet, while scaling down is accomplished by removing firewalls from the fleet. For organizations utilizing FWaaS solutions for security having employees distributed across a wide geographical area (e.g., nationwide), firewalls can be deployed in multiple different cloud regions provided by the cloud service provider (CSP) which offers the public cloud infrastructure on which the firewalls are deployed and run. Cloud regions correspond to the locations of physical infrastructure and hardware underlying the cloud resources offered by the CSP. For instance, in the United States, most CSPs have at least one cloud region in the east and at least one cloud region in the west, each of which correspond to a data center providing the servers and other hardware on which cloud-based services and cloud applications are run. Generally, security vendors offering a FWaaS solution to their customers require that at least one firewall be available in each cloud region at any given time to ensure availability.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. In other instances, well-known instruction instances, protocols, structures and techniques have not been shown in detail in order not to obfuscate the description.

Overview

Currently, when configuring deployment of firewalls based in the cloud that can be distributed across geographic locations corresponding to cloud regions, customers can select up to a maximum number of logical segregations of cloud regions supported by the security vendor where it is desired that firewalls are hosted. For instance, the security vendor may provide users with a list of 20 sub-regions which are logical segregations within a corresponding physical region, and the customer may select up to 20 of those sub-regions for deployment of firewalls. An example of sub-regions corresponding to a same physical region are sub-regions of Pacific Northwest, Southwest, and West Coast which correspond to the West cloud region. Customers often select the maximum number of available sub-regions due to lack of familiarity with the locations of the underlying physical regions, locations of remote employees or other users who will be serviced by the firewalls, or both. With many current region availability policies dictating that at least one firewall be available in a cloud region at any given time, as a result, the security vendor supports allocation of cloud resources in each selected region regardless of observed network traffic passing through each of the regions. Thus, the security vendor accumulates the cost to maintain the physical resources associated with a firewall experiencing little to no traffic within a region despite the limited use of this firewall. Additionally, even if the customers were to try to reduce the number of regions in which to deploy firewalls, they may not be aware of the optimal regions to select which are closest to the physical locations of users where firewall usage will be heaviest. Deploying firewalls in regions far from source regions of network traffic which will contribute most substantially to firewall usage can introduce latencies which negatively impact the customer's experience.

To resolve these issues, a service has been developed for automated and intelligent scaling of firewalls and selection of regions for firewall deployment, where firewalls can be scaled down to as few as zero in a region. The "scale to zero" solution for firewall scaling allows for reduction of costs for the security vendor maintaining the firewalls in the public cloud environments since the security vendor need not maintain at least one firewall in each cloud region to satisfy availability policies so long as at least one region has one active firewall running on the corresponding cloud. The automated selection of regions for firewall deployment enhances the customer's experience by reducing network traffic latencies since firewalls are deployed in cloud regions closest to users while also removing the guesswork conventionally associated with manual selection of regions for deployment of firewalls. These solutions can be implemented separately or together to reduce costs for security vendors and improve customer experience.

For automated scaling of firewalls to zero in a region, the service collects and evaluates usage metrics pertaining to firewalls deployed per region. Usage metrics collected for a region can include values corresponding to the number of users for which traffic is being inspected by firewalls deployed in the region, central processing unit (CPU) usage attributable to the cloud on which the firewalls run, and/or associated cloud bandwidth. The service evaluates the usage metrics of interest collected for a region against criteria for scaling the firewalls deployed in the region up or down, where a result of the evaluation can indicate that the number of available firewalls in the region should be scaled down to zero. Scaling down of firewalls to zero is conditioned on at least one other region having one or more firewalls available for traffic inspection such that the number of total firewalls available for inspection of network traffic is at least one at any given time. For automated selection of regions for firewall deployment, the service instantiates a firewall(s) in a first cloud region which has been selected by the customer or which corresponds to other configuration settings or preferences provided by the customer (e.g., a selected country). Usage metrics are collected and evaluated based on criteria which at least include criteria for scaling up of firewalls. If it is determined that additional firewalls should be deployed based on satisfaction of the criteria for scaling up, the service determines in which region(s) to add a firewall(s) based on the locations of users contributing significantly to usage of the existing firewalls as a result of the closest region to those users having no firewall available. If significant usage of the existing firewalls can be attributed to users closer to different regions, additional firewalls are deployed to the different regions, providing for cross-region scaling based on observed usage of firewalls.

Example Illustrations

Figure 1:
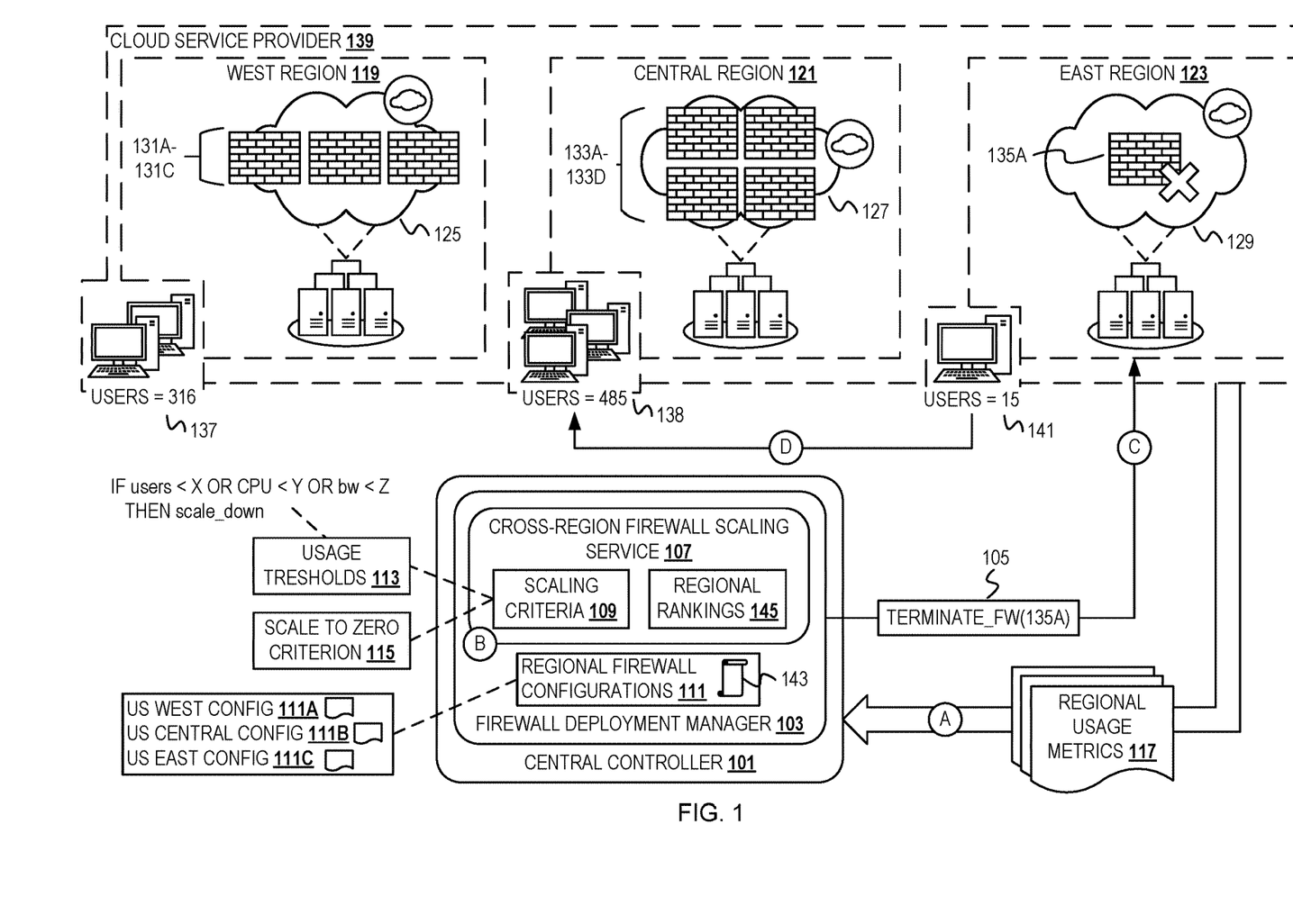
FIG. 1 depicts a conceptual diagram of dynamically scaling available cloud-based firewalls in a cloud region down to a minimum possible number of zero.

FIG. 1 depicts a conceptual diagram of dynamically scaling available cloud-based firewalls in a cloud region down to a minimum possible number of zero. FIG. 1 depicts an example in which a security vendor has cloud-based firewalls deployed for a customer in a west region 119, a central region 121, and an east region 123 (collectively the "regions 119, 121, 123") offered by a CSP 139. While the regions 119, 121, 123 are regions offered by the CSP 139 in the United States, firewalls can be deployed in any regions offered by various CSPs among implementations, including global regions. In the west region 119, firewalls 131A-C run on a cloud 125 which has been configured with an Internet gateway. In the central region 121, firewalls 133A-D run on a cloud 127 which has been configured with an Internet gateway. In the east region 123, a firewall 135A runs on a cloud 129 which has been configured with an Internet gateway. The clouds 125, 127, 129 are cloud environments provided by the CSP 139, such as virtual private clouds, in each of the respective regions, where the respective Internet gateways provide for communications between the Internet and instances running on the clouds 125, 127, 129. The firewalls 131A-C, firewalls 133A-D, and firewall 135A are cloud-based firewalls running on respective clouds 125, 127, and 129 (e.g., on virtual machines offered by the CSP 139) and inspect inbound and outbound network traffic. Firewalls running in any of the clouds 125, 127, 129 can execute in a virtual machine, container, or other cloud resource provided by the CSP 139. In this initial state assumed in FIG. 1, the number of firewalls deployed in each region is based on selection of regions in which to deploy firewalls by the customer.

Users 137, users 138, and users 141 are endpoint devices for which incoming and outgoing network traffic are inspected by the respective ones of the firewalls 131A-C, 133A-D, 135A. While not depicted in detail in FIG. 1, the users 137, 138, 141 may have connected to a virtual private network (VPN) associated with the customer (e.g., an IP security (IPsec) VPN or a Secure Sockets Layer (SSL)/Transport Layer Security (TLS) VPN). The users 137, 138, 141 have connected to the respective ones of the clouds 125, 127, 129 via the VPN. For instance, for each region, a user may have connected to a container, a virtual machine, or other cloud resource on which the corresponding firewall(s) run, where the connection was established with a domain name or IP address assigned to the cloud resource. The users 137, which encompasses a total of 316 users, are connected to the cloud 125 such that the firewalls 131A-C inspect incoming and outgoing network traffic (e.g., based on load balancing of network traffic across the firewalls 131A-C). The users 138, which encompasses 485 users, are connected to the cloud 127 such that the firewalls 133A-D inspect incoming/outgoing network traffic. The users 141, which encompasses 15 users, are connected to the cloud 129 such that the firewall 135A inspects incoming/outgoing network traffic. As an example, the customer may be a company having employees in geographic locations in the west coast, Midwest, and east coast, for which the closest cloud regions are the west region 119, central region 121, and east region 123, respectively. Network traffic sent to and from devices of each of those employees is forwarded to the region having available firewall(s) nearest to the employee. Thus, one of the users 137 may be in California and is serviced by the firewalls 131A-C, while one of the users 141 may be in North Carolina and is serviced by the firewall 135A.

FIG. 1 also depicts a central controller 101 on which a firewall deployment manager 103 executes. The central controller 101 may execute on an appliance managed by the customer (e.g., a server) or as a cloud-based service. The central controller 101 and programs executing thereon can communicate with the CSP 139 to obtain usage metrics across cloud regions, to manage configuration and deployment of firewalls and the associated cloud resources, etc. Regional firewall configurations ("configurations") 111 are attached to (i.e., installed on or otherwise made accessible to) the firewall deployment manager 103, which include a configuration 111A, a configuration 111B, and a configuration 111C for firewalls running in the west region 119, the central region 121, and the east region 123, respectively. The configurations 111 specify configurations for firewalls deployed across regions and maintain security policies 143. The security policies 143 are maintained centrally by the firewall deployment manager 103 so that the security policies 143 are included in configurations which are "pushed" (i.e., communicated) to newly-deployed firewalls across regions. The configurations 111 may also specify logical sub-regions within each region to designate the location of users within a region at a more granular level while mapping to the same IP address corresponding to the cloud serving the region. As an example, the configuration 111A for the west region 119 may include logical sub-regions corresponding to the Pacific Northwest, the Bay Area, and the southwest. The firewall deployment manager 103 includes a cross-region firewall scaling service ("service") 107. The service 107 facilitates scaling of firewalls within a region up or down to a minimum of zero based on collected usage metrics and cross-region scaling of firewalls based on collected usage metrics. Functionality of the service 107 for cross-region firewall scaling is described later in reference to FIG. 2.

FIG. 1 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the service 107 obtains regional usage metrics ("metrics") 117 from the CSP 139. The metrics 117 correspond to usage of the firewalls deployed in each of the regions 119, 121, 123 based on monitoring of the clouds 125, 127, 129 by the CSP 139. The service 107 can obtain the metrics 117 from the CSP 139 by submitting a request via an application programming interface (API) exposed by the CSP 139, such as an API of a cost/usage management service, metric collection service, etc. offered by the CSP 139. Alternatively, or in addition, the service 107 can monitor usage metrics pertaining to number of users per region based on monitoring numbers of users in each region connected to the VPN by which the clouds 125, 127, 129 are accessible, such as based on receipt of a notification or update as sessions begin or are terminated. Collection of usage metrics may be performed according to a schedule (e.g., hourly, daily, etc.). The metrics 117 may comprise, for each of the regions 119, 121, 123, indications of the number of users of the available firewall(s) based on the number of active connections of the respective one of the clouds 125, 127, 129, measured cloud bandwidth, and/or measured CPU usage corresponding to each cloud, as well as other data/metadata recorded for the clouds associated with the customer's cloud account. The service 107 may track metric values to determine changes in usage and/or can determine average usage as metrics are collected over a given time period, such as by determining changes in or averages of usage metrics over the course of a day or week.

At stage B, the service 107 evaluates the metrics 117 based on scaling criteria 109. The scaling criteria 109 are criteria for scaling firewalls in a region up or down based on observed usage. In this example, the scaling criteria 109 comprise usage thresholds 113 and scale to zero criterion ("criterion") 115. The usage thresholds 113 are one or more thresholds for usage metrics collected for a region which trigger a scaling event for the firewalls deployed in that region. For instance, the usage thresholds 113 may comprise an upper threshold for one or more metric types (e.g., thresholds for values of CPU usage, bandwidth, and/or number of users) which triggers scaling up of firewalls available in a region if satisfied and a lower threshold which triggers scaling down of firewalls available in a region if unsatisfied. As another example, the usage thresholds 113 can indicate upper and lower thresholds for observed changes in usage metrics over a period of time which trigger scaling of firewalls. Examples of thresholds for observed changes in usage metrics include upper and lower thresholds for a change in number of users, a change in average CPU usage, or a change in average cloud bandwidth monitored over the course of a week.

The criterion 115 comprise at least first criterion for scaling firewalls in a region down to zero available (e.g., by terminating/deactivating each firewall in the cloud environment of the region). If evaluation of values of the metrics 117 against the usage thresholds 113 results in an indication that available firewalls in a region will be scaled down to zero, such as if scaling down of firewalls will result in no remaining firewalls running in a cloud, the service 107 determines if the criterion 115 is also satisfied. The criterion 115 can indicate that available firewalls running in a region can be scaled down to zero if at least one other region has firewall availability so that at least one firewall is available for inspection of network traffic for users across regions at any given time. In this example, based on evaluation of values of the metrics 117 against these scaling criteria 109, the service 107 determines that those of the metrics 117 corresponding to the firewall 135A in the east region 123 satisfy the criteria to scale to zero. For instance, the service 107 may have determined that the usage metric values collected for the cloud 129/firewall 135A failed to satisfy a minimum threshold indicated in the usage thresholds 113 and that the availability of firewalls in the west region 119 and central region 121 satisfies the criterion 115.

At stage C, the service 107 terminates the firewall 135A. Termination of a firewall can include terminating execution of cloud resources on which the firewall runs. The service 107 communicates a request 105 to terminate the firewall 135A to the CSP 139, such as via an invocation of an API exposed by a service of the CSP 139 for management of cloud resources. The request 105 may indicate an identifier(s) of the cloud resource(s) associated with the firewall 135A which the service 107 may have recorded at the time of provisioning of the firewall 135A, such as an identifier(s) of the container, virtual machine, etc. in which the firewall 135A executed. As a result of termination of the firewall 135A, there are zero firewalls available in the cloud 129 of the east region 123, thus resulting in scaling of firewalls in the east region 123 to zero.

At stage D, the service 107 orchestrates connection of the users 141 to the cloud 127 in the central region 121. The service 107 maintains regional rankings 145 which indicate, for each region, rankings or priorities of others of the cloud regions offered by the CSP 139 based at least partly on geographic distances between regions and also may indicate whether each cloud region has a firewall(s) available. For instance, a ranking or priority for the east region 123 may indicate the central region 121 as having a higher ranking or priority than the west region 119 due to its closer geographic proximity. The service 107 thus determines that users 141 serviced by the firewall 135A in the cloud 129 should now be serviced by the firewalls 133A-D in the cloud 127 based on the central region 121 being the highest ranked region with firewall availability. The service 107 orchestrates reconnection of the users 141 to the next closest cloud with firewall availability determined from the regional rankings 145, which is the cloud 127. As an example, the service 107 can orchestrate the reconnection by submitting a request to a Domain Name System (DNS) server to update a record maintained for the fully qualified domain name (FQDN) associated with the cloud 129 to indicate an IP address of the cloud 127 instead of the IP address of the cloud 129. The FQDN assigned to the clouds 127, 129 may be indicated in the respective ones of the configurations 111. Incoming and outgoing network traffic for the users 141 will then be sent to the cloud 127 for inspection by one of the firewalls 133A-D before communication to its destination. As a result, the security vendor providing the cloud-based firewalls to the customer will not accumulate the costs for maintaining cloud resources in the east region 123 which experience minimal usage by the customer.

Figure 2:
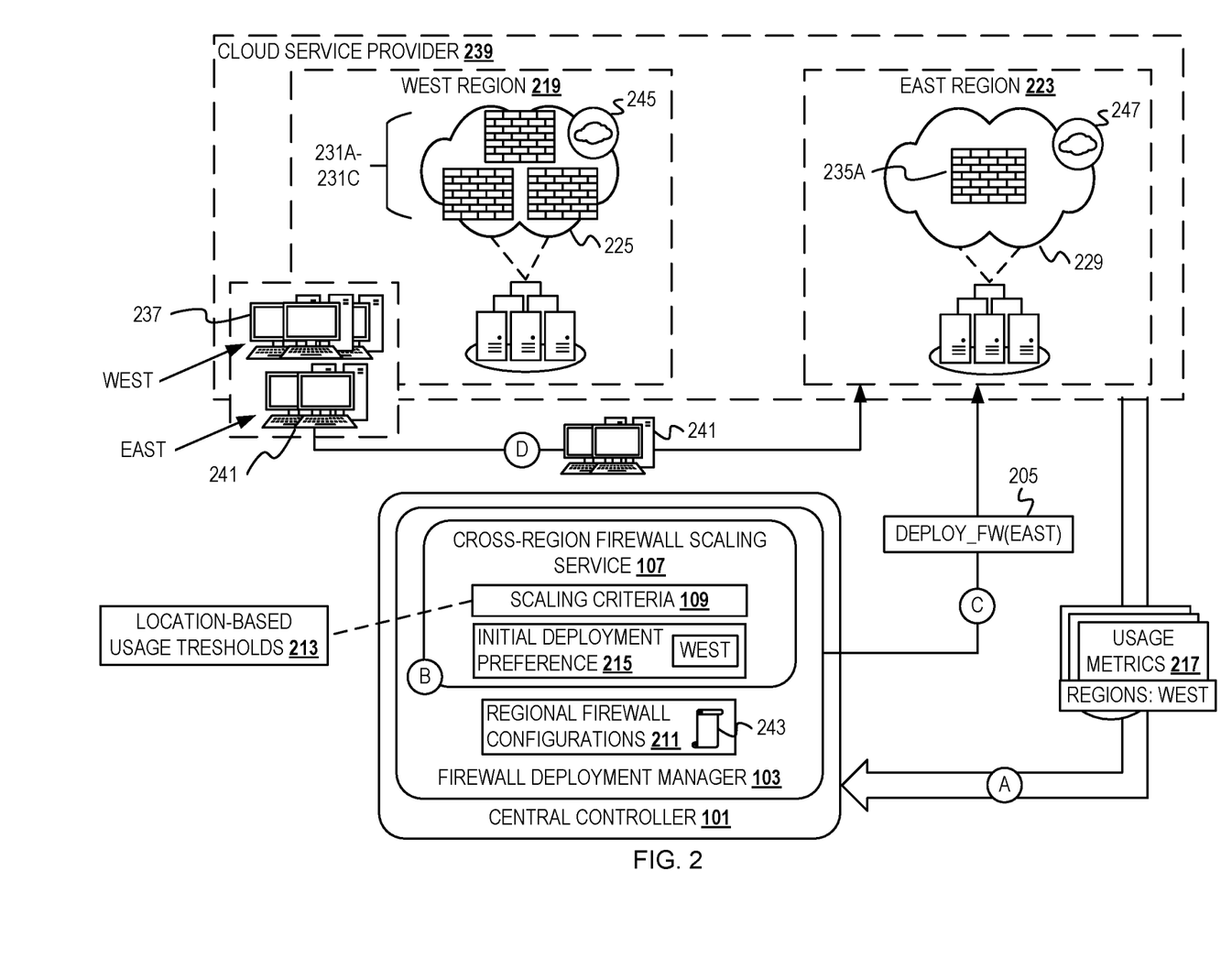
FIG. 2 depicts a conceptual diagram of intelligent selection of regions in which to deploy cloud-based firewalls when scaling up based on monitored usage of existing firewalls.

FIG. 2 depicts a conceptual diagram of intelligent selection of regions in which to deploy cloud-based firewalls when scaling up based on monitored usage of existing firewalls. A west region 219 provides cloud resources of a CSP 239 to a customer as similarly described above. The CSP 239 may be the same provider as the CSP 139 or may be different. A cloud 225 (e.g., a virtual private cloud) runs on resources located in the west region 219, and firewalls 231A-C execute in the cloud 225 (e.g., in a virtual machine(s), container(s), etc. provided by the CSP 239). The cloud 225 has been configured with an Internet gateway 245 to provide for communication between the cloud 225 and the Internet. Users 241 and users 237 may have connected to the cloud 225 via a VPN offered by the customer as similarly described in reference to FIG. 1. The users 241 are physically located in an eastern region, and the users 237 are located in a western region. As used herein, the location of a user refers to the geographic region corresponding to the cloud region to which the user is nearest. Thus, the users 237 are closest to the west region 219 based on geographic proximity thereto, and the users 241 are closest to an east region 223. Initially, there are no firewalls available in the east region 223.

The service 107 also maintains an initial deployment preference ("preference") 215. The preference 215 can be an input provided by the customer which indicates an initial region or other geographic area in which a firewall(s) should be deployed initially (i.e., prior to scaling up across regions) or may be a default value if no preference is provided by the customer. In some examples, rather than specific cloud regions, the preference 215 may be a country or continent encompassing several regions such that the first firewall(s) is deployed in any region within the country/continent selected by the service 107. Subsequently deployed firewalls may also be deployed to regions within the country/continent to restrict cross-border flow of network traffic if desired by the customer and also selected as a preference. In this example, the preference 215 indicates the west region 219.

FIG. 2 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the service 107 obtains usage metrics ("metrics") 217. The metrics 217 comprise usage metrics collected based on the CSP 239 monitoring usage associated with the firewalls 231A-C in the west region 219 (e.g., based on monitored usage of the cloud 225). As similarly described above, the service 107 may request the metrics 217 from the CSP 239, such as from a cost/usage management service of the CSP 239 based on invocation of a function(s) of the API of the service. Alternatively, or in addition, the service 107 may itself monitor a usage metric corresponding to the number of active connections to the cloud 225 which corresponds to the number of users in the west region 219. Collection of usage metrics may be performed according to a schedule. Values of the metrics 217 can comprise the number of users of the firewalls 231A-C available in the west region 219 based on active connections to the cloud 225, cloud 225 bandwidth, and/or CPU usage monitored for the cloud 225. The service 107 may track or record metric values (e.g., over the course of a week) to determine changes in usage and/or average usage based on metric values obtained during a time interval which may be a configurable setting of the service 107.

At stage B, the service 107 evaluates the metrics 217 based on the scaling criteria 109, which include location-based usage thresholds ("thresholds") 213. The thresholds 213 comprise thresholds for values of usage metrics attributable to users within a same region. Usage metrics can be considered attributable to users in a same region if the metrics correspond to usage by users located in/proximate to the region. As an example, a first subset of the metrics 217 is attributable to users within the east region 223, while a second subset of the metrics 217 is attributable to users within the west region 219, or the users 241 and the users 237, respectively. Determining usage based on locations of the users contributing to the usage for evaluation against the thresholds 213 provides insight into whether usage of a firewall(s) in one region by users outside of that region is substantially heavy and warrants making available a firewall(s) in another region closer to those users to reduce latency. The service 107 determines the subsets of the metrics 217 which are attributable to users in the same region and evaluates values of those subsets of metrics against the thresholds 213. The subset of the metrics 217 attributable to users having a common region can be determined based on locations which correspond to IP addresses associated with the metrics 217, based on the number of active VPN connections per region monitored by the service 107, or a combination thereof. In this example, the service 107 determines a number of users, CPU usage, and/or cloud bandwidth of the cloud 225 which are attributable to the users 237 and those which are attributable to the users 241 based on the locations associated with IP addresses corresponding to the users 237, 241. The service 107 then determines that those of the metrics 217 attributable to the users 241 located closer to the east region 223 satisfy a first of the thresholds 213.

At stage C, the service 107 deploys a firewall 235A to a cloud 229 running in the east region 223. Deployment of firewalls can include provisioning a cloud resource(s) on which a firewall will run and configuring the firewall to run on the cloud resource(s), including attaching security policies to the firewall. Like the cloud 225, the cloud 229 has also been configured with an Internet gateway 247 so that the firewall 235A can inspect inbound and outbound network traffic. The service 107 communicates a request 205 to the CSP 239 to instantiate a firewall 235A running on the cloud 229, such as via an invocation of an API exposed by a service of the CSP 239 for management of cloud resources. The request 205 may indicate a first of regional firewall configurations ("configurations") 211 for configuration for the firewall 235A and security policies 243 to be attached to the firewall 235A. As a result of deployment of the firewall 235A to the cloud 229, a firewall is now available in the east region 223.

At stage D, the service 107 orchestrates connection of the users 241 to the cloud 229 in the east region 223. Orchestration of the connection of the users 241 facilitates reconnection of the users 241 from the cloud 225 to the cloud 229 to provide for minimal interruption of firewall service as a result of scaling up into the east region 223. The service 107 can orchestrate the connection by inserting a new record into a DNS server (e.g., a nameserver) which indicates a domain name assigned to the cloud 229 and its IP address, such as the FQDN assigned to the cloud. The service 107 may maintain indications of the domain names assigned to clouds across regions in which firewalls can be made available and the corresponding IP addresses. The record inserted into the DNS server may thus specify the domain name of the cloud 229 determined from the maintained indications of domain names. The service 107 can provide the domain name of the cloud 229 to the users 241 to trigger the reconnection. For instance, the users 241 may have client software installed on the respective client devices with which the service 107 communicates (e.g., client software associated with the VPN with which the connection was initially established). The service 107 may then communicate the domain name of the cloud 229 to each of the users 241, which triggers the reconnection to the cloud 229 client-side. For instance, the users 241 may update the connection established with the cloud 225 with the domain name of the cloud 229 communicated by the service 107. Incoming and outgoing network traffic for the users 241 will then be sent to the cloud 229 for inspection by the firewall 235A before communication to its destination.

FIGS. 3A-5B are example operations for intelligent deployment region selection and scaling of cloud-based firewalls. The example operations are described with reference to a cross-region firewall scaling service (hereinafter "the service") for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 3A:
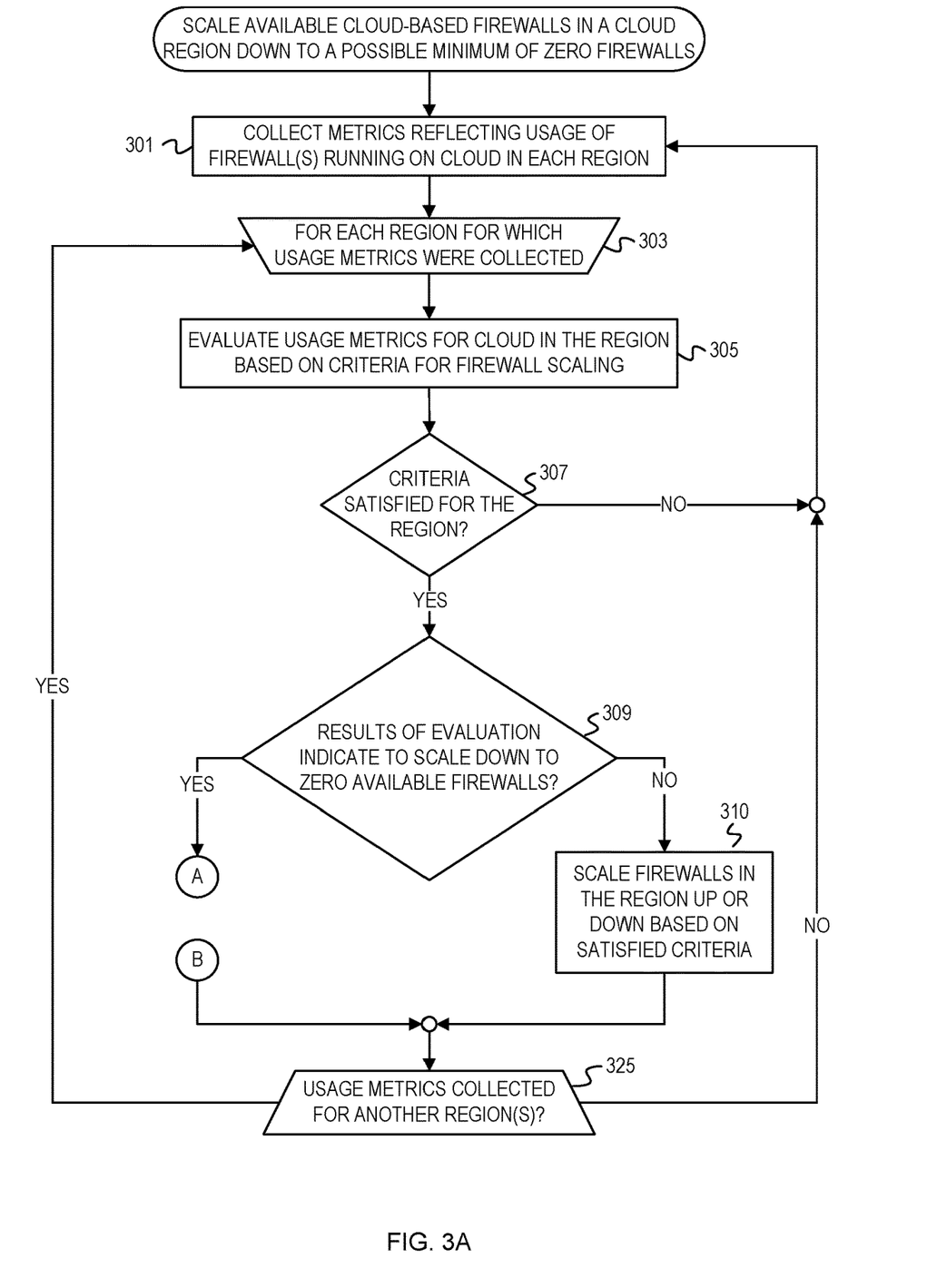
FIGS. 3A-3B is a flowchart of example operations for scaling available cloud-based firewalls in a cloud region down to a possible minimum of zero firewalls.
Figure 3B:
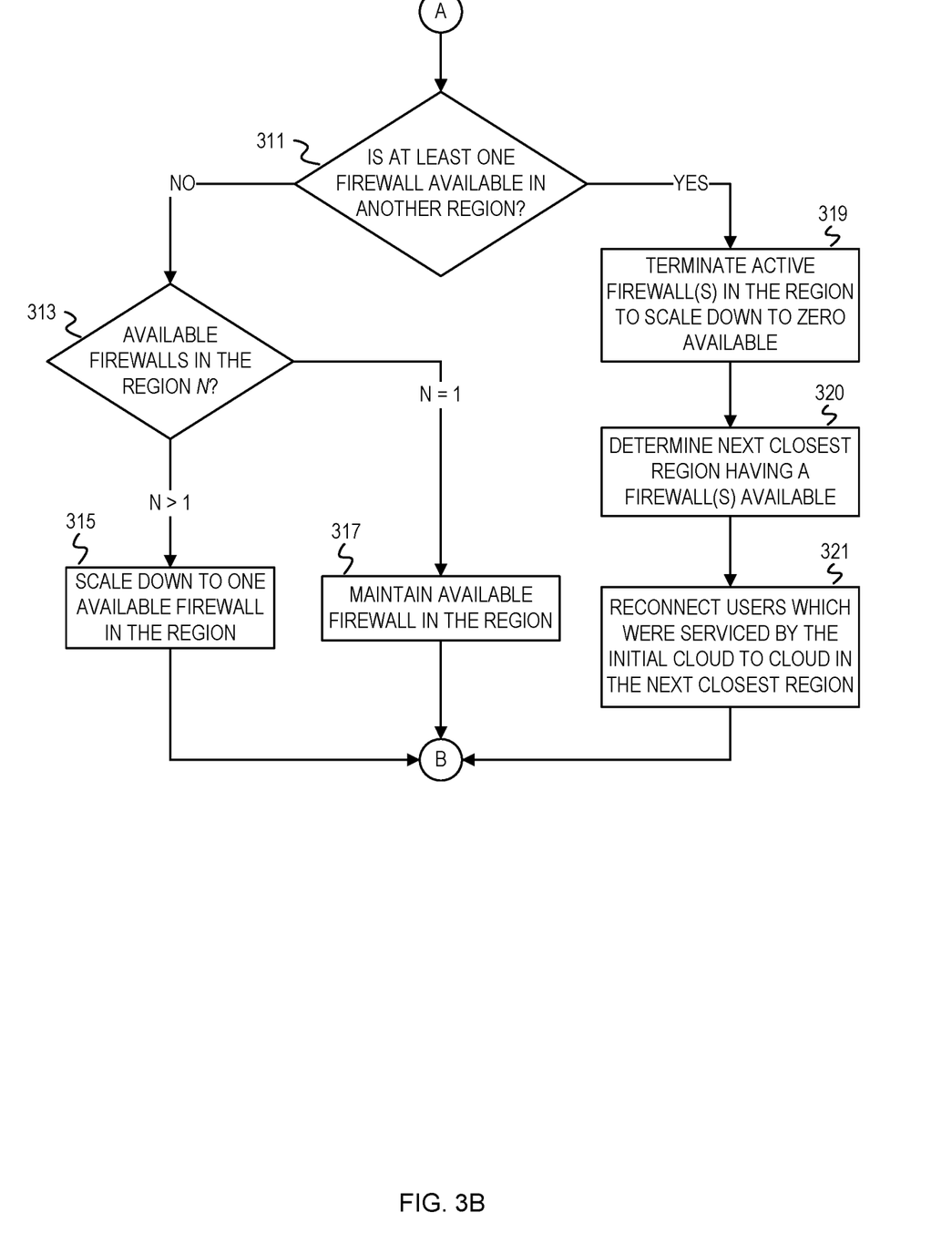

FIGS. 3A-3B is a flowchart of example operations for scaling available cloud-based firewalls in a cloud region down to a possible minimum of zero firewalls. Autoscaling of firewalls down to zero may be implemented with or without auto-selection of regions for firewall deployment.

At block 301, the service collects metrics reflecting monitored usage of one or more firewalls which are running on a cloud in each region that has a firewall(s) available. The service can collect the usage metrics pertaining to cloud resources in each region having a firewall(s) available from a service(s) of the CSP which monitors cloud resource usage (e.g., via an API(s) exposed by the service(s)). Collected usage metrics for clouds running in each region can include values for number of users of the associated cloud resources, CPU usage of the cloud, and/or cloud bandwidth. Collection of usage metrics from the CSP may be performed according to a schedule or may be triggered based on the passage of a configurable interval of time. The service may also collect usage metrics pertaining to number of users based on tracking the number of active VPN connections in each region, where the data/metadata which is maintained for each connection indicates a source region in which the user is located. If the source region corresponds to a logical sub-region within a broader, physical region, the service can determine the broader region based on a configuration file(s), data structure, etc. which it maintains that indicates mappings between logical sub-regions and physical regions. The service may also track values of usage metrics obtained from each collection event to determine average usage based on averaging the usage metric values of each metric type and/or to track changes in usage.

At block 303, the service begins iterating over each region for which usage metrics were collected. At block 305, the service evaluates the firewall usage metrics for the cloud in the region based on one or more criteria for firewall scaling. Evaluation of usage metrics may be performed according to a schedule that may be the same as or different from the schedule for metric collection or may be triggered based on a configurable number of collection events being completed (e.g., after every seven metric collection events to evaluate average metric values or changes in recorded metric values). The criteria include one or more thresholds for values of usage metrics. For instance, the criteria can include thresholds for values of each metric type of interest, such as number of users, CPU usage, and/or cloud bandwidth. The thresholds may include at least one upper and lower threshold for each metric type, where values satisfying the upper threshold will trigger scaling up of firewalls and failing to satisfy the lower threshold will trigger scaling down of firewalls. Alternatively, or in addition, the thresholds may include upper and lower thresholds for changes in values of usage metrics over a configurable time period, such as observed changes in metric values over the course of a week. The service evaluates the usage metrics through comparison of values of the usage metrics corresponding to each region with the thresholds to determine if, for each region, metric values of at least one type satisfy an upper threshold, fail to satisfy a lower threshold, etc.

At block 307, the service determines if a value(s) of the usage metrics corresponding to the region satisfied at least a first of the criteria. If one or more usage metric values satisfy a criterion to scale firewalls in the region, operations continue at block 309. Otherwise, operations continue at block 301 for the next usage metric collection event.

At block 309, the service determines if the results of the evaluation of the usage metrics against the criteria indicated to scale down to zero available firewalls in the region. For instance, the results of the evaluation may have indicated to scale down to zero based on failure to satisfy a lower threshold which triggers scaling down of firewalls. The service may determine that there is one available firewall in the region and scaling down will yield zero available firewalls in the region. As another example, the lower threshold may have indicated to scale down to zero if unsatisfied. If the results of the evaluation indicate to scale down to zero firewalls, operations continue at transition point A, which continues at block 311 of FIG. 3B. Otherwise, operations continue at block 310.

At block 310, the service scales firewalls in the region up or down based on which of the criteria were satisfied. The service scales the number of available firewalls up in the region if a usage metric value(s) satisfied a criterion to scale up, such as based on satisfying an upper threshold. The service scales firewalls down in the region if a usage metric values(s) satisfied a criterion to scale down, such as based on failing to satisfy a lower threshold. Scaling of firewalls can be based on instantiating or provisioning cloud resources to scale up or terminating execution of or relinquishing cloud resources to scale down.

At block 311, the service determines if at least one firewall is available in another region. The service may maintain or have access to data about regional firewall deployments that indicate which regions have firewalls available and/or how many firewalls are available per region. If there are no other regions which have available firewalls, operations continue at block 313. Otherwise, if at least one other region has a firewall available, operations continue at block 319.

At block 313, the service determines the number of available firewalls in the region. The service can monitor the number of firewalls running in clouds across regions. If there is more than one firewall available in the region, operations continue at block 315, where the service scales down the number of firewalls available in the region to one to satisfy the criteria that one firewall is available at any given time for users across regions. The service can submit a request to a service of the CSP to terminate/deactivate cloud resources so that one firewall remains running in the cloud corresponding to the region after termination/deactivation of cloud resources. If there is one available firewall in the region, operations continue at block 317, where the service maintains the available firewall in the region so that the criteria that at least one firewall is available at any given time is satisfied. Operations continue at transition point B, which continues at block 325 of FIG. 3A.

At block 319, the service terminates the active firewall(s) in the region to scale down to zero available. The service can submit a request to terminate/deactivate cloud resources supporting the firewall(s) running on the cloud in the region to the CSP (e.g., to a service which manages cloud resources via its API). Termination or deactivation of cloud resources supporting the firewalls running on the cloud in the region results in no available firewalls remaining in the region.

At block 320, the service determines the next closest region which has at least one firewall available. The service can maintain rankings, priorities, etc. for each region which indicate the other regions offered by the CSP with a cloud available ranked or prioritized by distance. The service may also maintain indications of whether each region has a firewall(s) available in association with the rankings or priorities so the service can determine another region which is nearby and has firewall availability.

At block 321, the service reconnects users which were serviced by the initial cloud in which firewalls were scaled down to zero to the cloud in the next closest region. For instance, the service can update a record maintained in a DNS server for the domain name assigned to the cloud in which firewalls were just scaled down to zero to indicate an IP address associated with a cloud in the next closest region. The service may maintain indications of the domain names, including FQDNs, assigned to clouds across regions and the corresponding IP addresses. The service can submit a request to the DNS server to update the entry maintained for the FQDN assigned to the cloud, where the update request indicates an IP address associated with the cloud in the next closest region. Updating the FQDN to IP address mapping results in reconnecting users to the cloud in the next closest region so that network traffic is then inspected by the firewall(s) running on the cloud in that region. Operations continue at transition point B, which continues at block 325 of FIG. 3A.

At block 325, the service determines if usage metrics were collected for another region(s). If usage metrics were collected for another region, operations continue at block 303. Otherwise, operations continue at block 301 for the next usage metric collection event.

Figure 4:
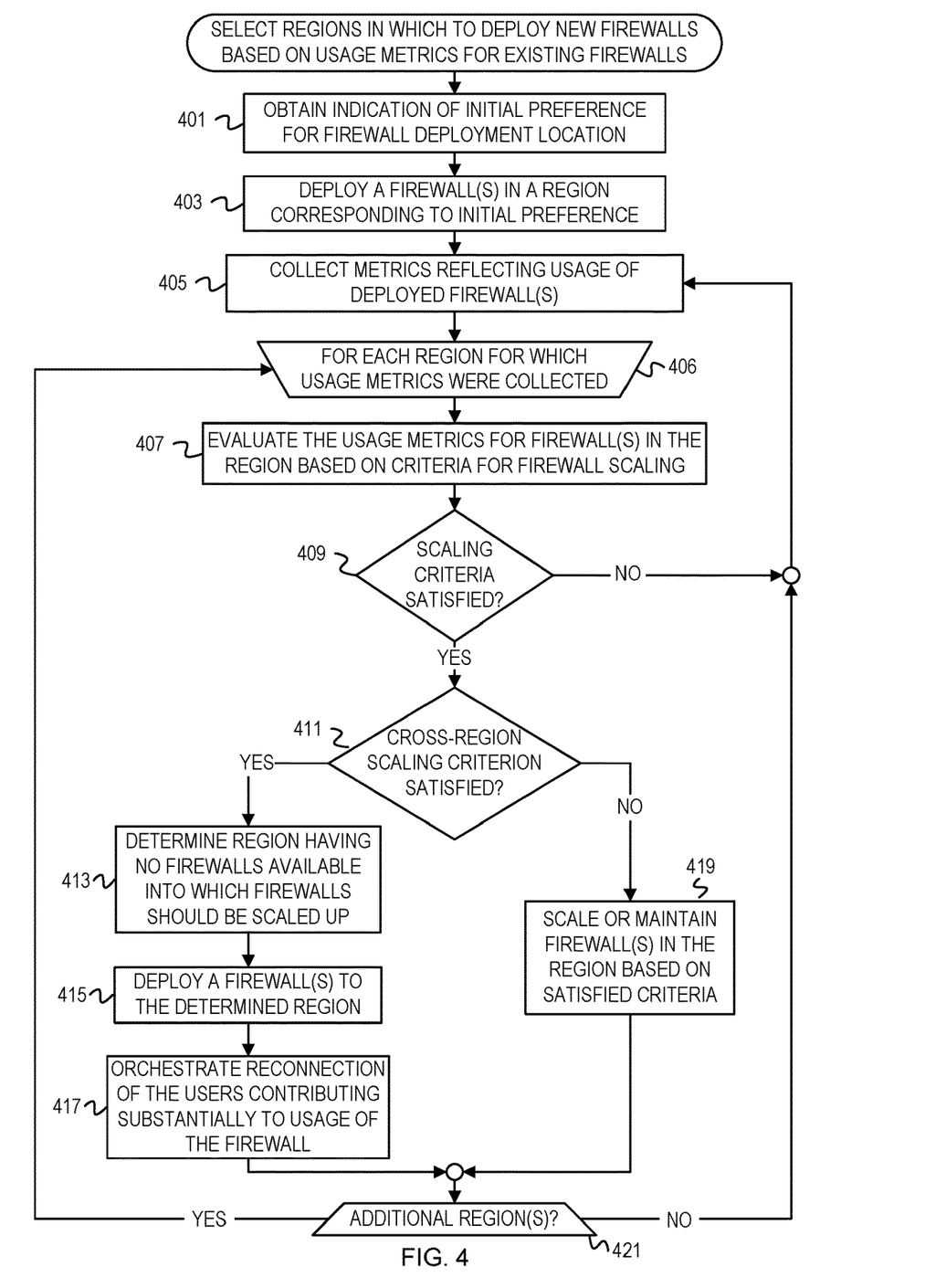
FIG. 4 is a flowchart of example operations for cross-region scaling of new firewalls based on usage metrics collected for existing firewalls.

FIG. 4 is a flowchart of example operations for cross-region scaling of new firewalls based on usage metrics collected for existing firewalls. Auto-selection of regions for firewall deployment may be implemented with or without autoscaling of firewalls down to zero.

At block 401, the service obtains an indication of an initial preference for firewall deployment location. The initial preference may be obtained from input by a customer or may be default value with which the service has been configured if input is not provided by the customer. The preference may specify one of the cloud regions offered by the CSP. In other examples, the preference may indicate a broader geographic region such as a country or continent in which the CSP has at least one region available, where more general preferences at the level of country or continent may also indicate that cross-region scaling should be restricted to that country or continent if flow of network traffic across borders of the country or continent is not desired.

At block 403, the service deploys at least a first firewall in a region which corresponds to the initial preference. If the initial preference was a specific region, the service initiates deployment of a firewall to that region. If the initial preference was a broader geographic area which includes more than one region, such as a country or continent, the service can deploy the firewall based on any of the regions. For instance, the service may be configured with a default region for each country or continent having a region located therein, and the service can then deploy the firewall to the default region if an initial preference indicates one of the countries or continents for which a default has been specified. Otherwise, if the preference is a broader geographic region which does not have a regional location of the CSP available therein, the service can determine the nearest region and deploy the firewall to that region. The service can deploy the firewall to the region based on submission of a request(s) to the CSP to provision the resources which support cloud-based firewall deployment and set up/configure a firewall running thereon (e.g., via an API exposed by a service(s) of the CSP).

At block 405, the service collects metrics reflecting usage of the deployed firewall(s) in each region. For the first collection event, the collected metrics will correspond to the firewall(s) within the initial region. Subsequently, usage metrics for clouds across regions can be collected. The usage metrics for the cloud running in each region can comprise values corresponding to the number of users of the firewall(s) running on the cloud, a cloud bandwidth, and/or CPU utilization by the cloud. As described above, the service can collect usage metrics according to a schedule or based on passage of a configurable interval of time. The service may track/record values of usage metrics of each metric type to determine changes in usage and/or determine average usage during a configurable time period, such as average usage and/or changes in usage over the course of a week.

At block 406, the service begins iterating over each region for which usage metrics were collected. After the first evaluation event, this includes the region corresponding to the initial deployment location. Upon subsequent cross-region scaling of firewalls, this may include multiple regions.

At block 407, the service evaluates the usage metrics for the firewall(s) in the region based on criteria for firewall scaling. In addition to the criteria for scaling firewalls up or down described above, the criteria include a cross-region scaling criterion. The cross-region scaling criterion is a criterion to scale up and into another region in which a firewall is not yet available instead of scaling up within a region. The cross-region scaling criterion can be differentiated from general criteria for scaling up in that this is a criterion for usage metrics attributable to users located in the same region. As also described above, usage metrics can be considered attributable to users in a region if the metrics correspond to usage by users located in or proximate to the region, where location of users can be determined based on the associated IP addresses. The criterion can comprise at least a first threshold against which usage metric values attributable to users located within a single region are evaluated, where the single region is one that is outside of the region for which the usage metrics were collected.

At block 409, the service determines if at least a first of the scaling criteria has been satisfied. The scaling criterion which was satisfied may have been one to scale up, including the cross-region criterion, or one to scale down in the region. If a criterion has been satisfied, operations continue at block 411. If none of the scaling criteria were satisfied, operations continue at block 405 for the next metric collection event.

At block 411, the service determines if the cross-region scaling criterion was satisfied. The cross-region scaling criterion may have been satisfied if a value of a usage metric associated with firewall usage in the region that is attributable to users within another, different region satisfied a threshold. An example of a value of a usage metric that is attributable to a different region which satisfies the criteria is a value X corresponding to an increase in the number of users located in the different region which use the firewall(s) over the past week that satisfies a first threshold. Another example is a value Y corresponding to a total number of users located in the different region which use the firewall(s) at the time of the metric collection event that satisfies a second threshold. If the cross-region scaling criterion is not satisfied, operations continue at block 413. If the criterion is satisfied, operations continue at block 419.

At block 413, the service determines a region having no firewalls available into which firewalls should be scaled up. The region currently having no firewall availability and into which firewalls should be deployed is the region associated with the users to which the usage metric value(s) which satisfied the cross-region scaling criterion is attributable. As an example, if the usage metrics collected for the central region are being evaluated and the number of users located in the east region satisfied a threshold indicated as the cross-region scaling criterion, the service determines that firewalls should be scaled up into the east region.

At block 415, the service deploys at least one firewall to the determined region. A cloud may already be available in the determined region, or the service can instantiate a cloud environment in the determined region as part of the firewall deployment. The service can deploy the firewall to the region based on submission of a request(s) to the CSP to provision the resources which support cloud-based firewall deployment and set up/configure a firewall running thereon.

At block 417, the service orchestrates reconnection of the users for which the usage metrics satisfied the cross-region scaling criterion from the cloud in the initial region to the cloud in the determined region. For instance, the service can insert a record in a DNS server which indicates a domain name assigned to the cloud in the determined region. The service can maintain indications of domain names assigned to clouds which may be running across regions. The service submits a request to the DNS server to insert the domain name assigned to the cloud on which the newly-deployed firewall runs and the corresponding IP address (e.g., via an API of the DNS server). The domain name assigned to the cloud can then be provided to the users to which the metric value(s) satisfying the criterion were attributable so that the users may then connect to the cloud in the closer region, such as based on reconnecting to the customer's VPN with the domain name.

At block 419, the service scales down or maintains firewalls in the region based on the satisfied criterion which did not indicate cross-region scaling. If a criterion to scale firewalls up within the region was satisfied, the service deploys a firewall(s) accordingly. If a criterion to scale firewalls down was satisfied, the service can scale down the firewalls and may scale down to zero firewalls as described in FIGS. 3A-3B if a criterion to scale to zero was satisfied. If no criteria were satisfied, the service maintains the number of firewalls available in the region without scaling.

At block 421, the service determines if usage metrics for at least one more region were collected. If usage metrics for at least one more region were collected, operations continue at block 406. If usage metrics for each region have been evaluated and no more regions remain, operations continue at block 405 for the next usage metric collection event.

Figure 5A:
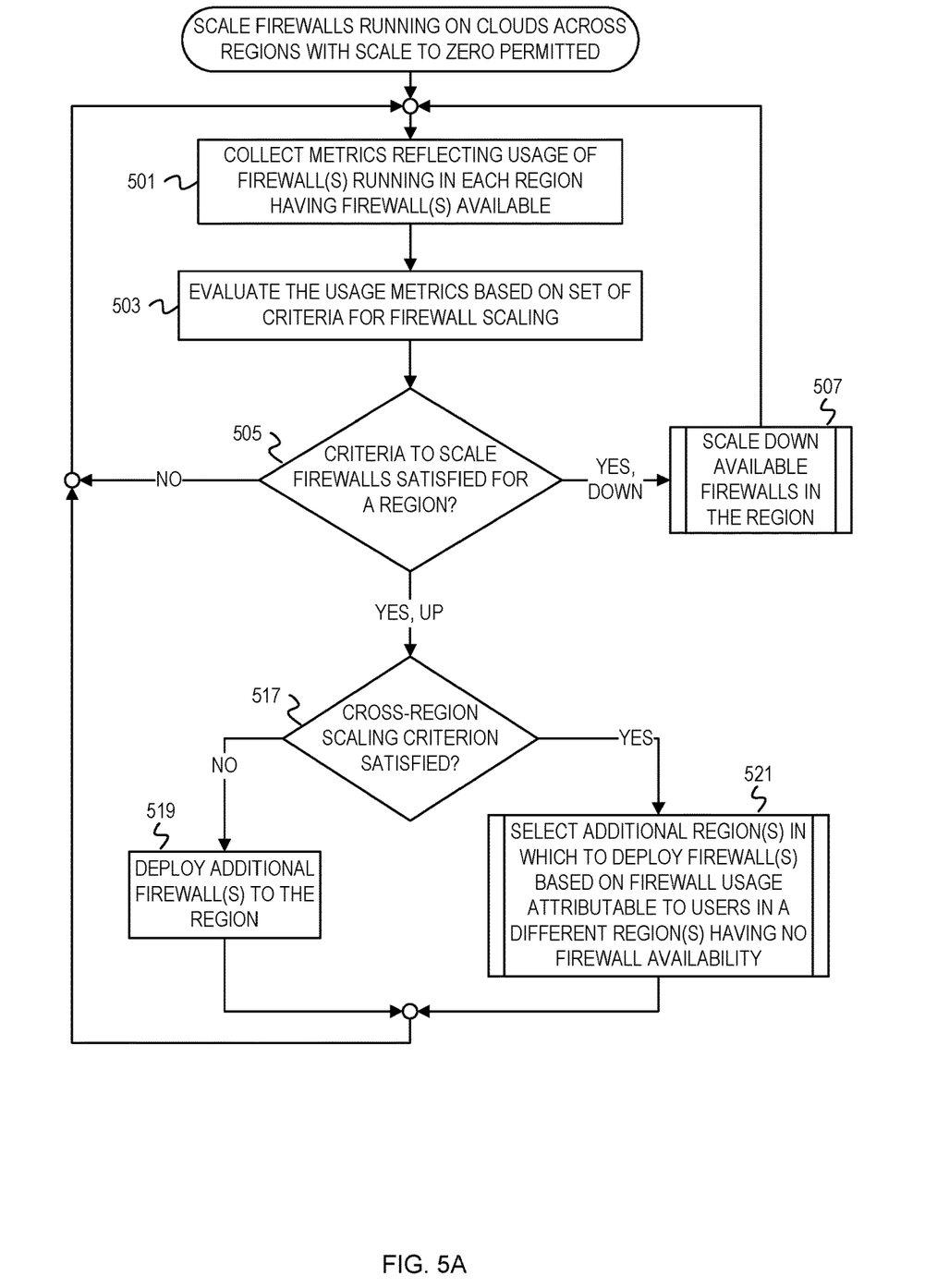
FIGS. 5A-5C are a flowchart of example operations for scaling firewalls running on clouds across zero with scaling to zero permitted.
Figure 5B:
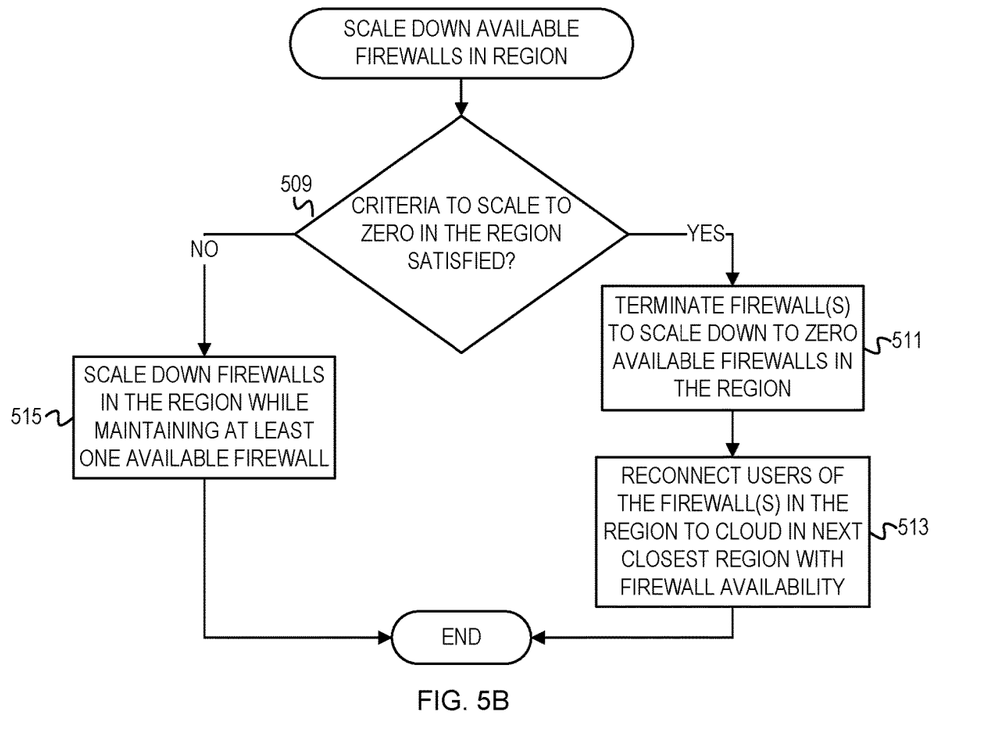
Figure 5C:
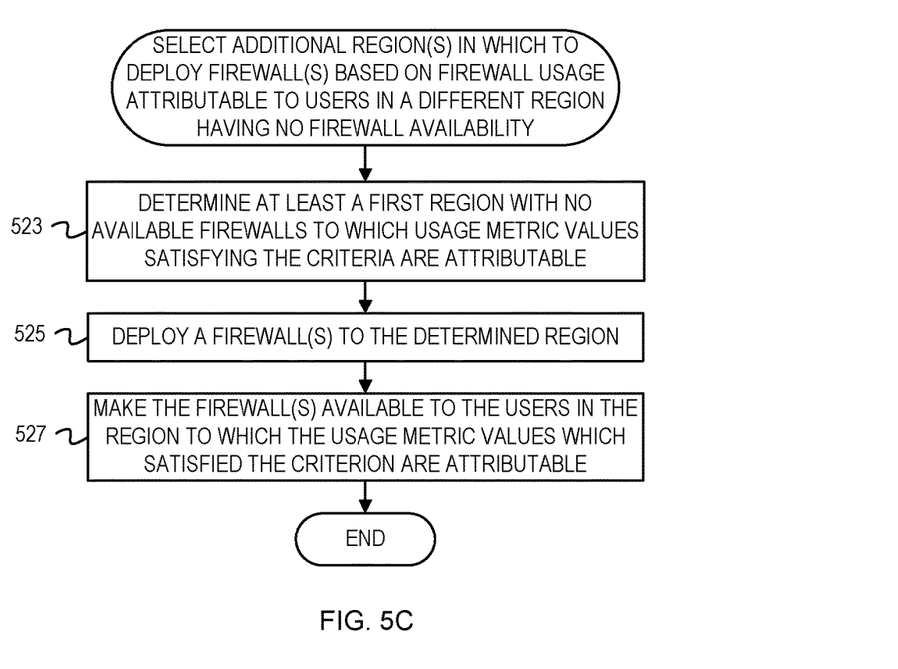

FIGS. 5A-5C are a flowchart of example operations for scaling firewalls running on clouds across zero with scaling to zero permitted. The example operations describe autoscaling down to a minimum of zero available firewalls and auto-selection of regions for firewall deployment implemented in tandem.

At block 501, the service collects metrics reflecting usage of one or more firewalls running in each region which has a firewall(s) available as similarly described above. At block 503, the service evaluates the collected usage metrics based on a set of criteria for firewall scaling. The criteria comprise one or more criteria to scale firewalls up in a same region, to scale firewalls up into a different region, and to scale firewalls down in a region to a possible minimum of zero firewalls. Each criterion can comprise a threshold(s) for a value of each usage metric type of interest, where each threshold can be an upper or lower threshold (e.g., for scaling up or down, respectively). The threshold can be for a value of the usage metric at the time of the collection event, for a change in the values observed during a time period (e.g., a delta), or an average of the values collected during a time period.

At block 505, the service determines if at least a first of the criteria to scale firewalls was satisfied for a region. If a criterion was satisfied which triggers scaling down of firewalls, operations continue at block 507. If a criterion was satisfied which triggers scaling up of firewalls, operations continue at block 517. If none of the criteria were satisfied, operations continue at block 501 for the next metric collection event.

At block 507, the service scales down the available firewalls in the region. FIG. 5B is a flowchart of example operations for scaling down of firewalls. At block 509, the service determines if a usage metric value(s) satisfies one or more criteria to scale the number of available firewalls down to zero. The criteria can indicate that firewalls should be scaled down to zero if a value(s) of the usage metric(s) fails to satisfy a threshold and at least one other region currently has at least one firewall available. If the usage metric value(s) satisfies the criteria, operations continue at block 511. Otherwise, operations continue at block 515, where the service scales down firewalls in the region through termination of firewalls while maintaining at least one available firewall running on the cloud offered in the region. From block 515, operations continue at block 501 of FIG. 5A for the next metric collection event.

At block 511, the service terminates each firewall running on a cloud in the region to scale down to zero available firewalls in the region. At block 513, the service reconnects users of the firewall(s) which were terminated to a cloud in the next closest region with firewall availability. Reconnection of the users may be achieved at least partly by the service sending a request to a DNS server to replace an IP address associated with the FQDN assigned to the cloud on which firewalls were just scaled to zero with an IP address corresponding to the cloud located in the next closest region. Operations continue at block 501 for the next metric collection event.

At block 517, the service determines if a cross-region scaling criterion was satisfied based on one or more of the collected usage metric values being attributable to users in another, different region and satisfying at least a first threshold. If the cross-region scaling criterion was satisfied, operations continue at block 519, where the service deploys an additional firewall(s) to the region to scale up within the region. Operations then continue at block 501 of FIG. 5A for the next usage metric collection event. If the cross-region scaling criterion was satisfied, operations continue at block 521.

At block 521, the service selects at least a first additional region in which to deploy a firewall(s) based on firewall usage attributable to users in a different region which currently has no firewall availability. FIG. 5C is a flowchart of example operations for cross-region deployment of firewalls. At block 523, the service determines at least a first region that currently has no available firewalls associated with the users to which the usage metric values satisfying the criterion are attributable. At block 525, the service deploys a firewall(s) to the determined region. At block 527, the service makes the firewall(s) available to those of the users in the region to which the usage metric values which satisfied the cross-region scaling criterion were attributable.

Making the firewall(s) available can include inserting a mapping between a domain name assigned to the cloud on which the newly-deployed firewall(s) run and an IP address of the cloud into a DNS server and indicating the domain name to the users who will be serviced by the firewall(s). Operations then continue at block 501 of FIG. 5A for the next usage metric collection event.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, with respect to FIGS. 3A-3B and FIG. 4, the operations depicted in blocks 303-325 and blocks 406-421 performed for each region can be performed in parallel or concurrently instead of iteratively for each region. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
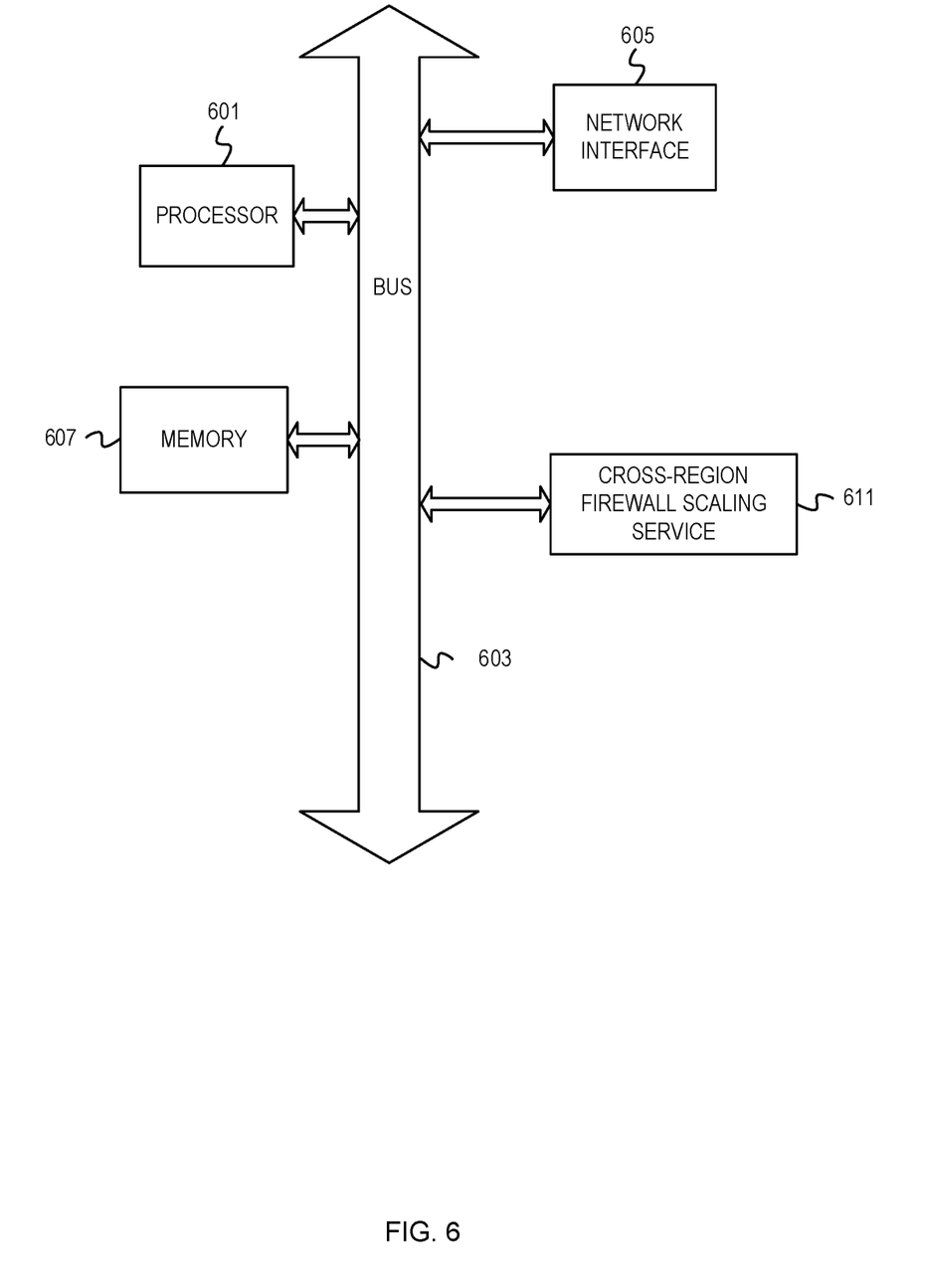
FIG. 6 depicts an example computer system with a cross-region firewall scaling service.

FIG. 6 depicts an example computer system with a cross-region firewall scaling service. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes cross-region firewall scaling service 611. The cross-region firewall scaling service 611 facilitates dynamic scaling up or down of cloud-based firewalls based on observed usage, where the cloud-based firewalls can be scaled down to zero upon satisfaction of certain criteria. The cross-region firewall scaling service 611 also facilitates cross-region scaling up of firewalls based on observed usage. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for intelligent deployment region selection and scaling to zero of cloud-based firewalls as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider, where these resources of the cloud service provider are referred to as "cloud resources," and the geographic locations of the cloud resources are referred to as "cloud regions" or more simply "regions." In more general terms, a cloud service provider resource accessible to customers is a resource owned/managed by the cloud service provider entity that is accessible via network connections. Often, the access is in accordance with an application programming interface or software development kit provided by the cloud service provider. When referring to a "cloud region" or more simply a "region," this description is referring to the geographic location of cloud resources.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
   obtaining usage metrics associated with a first cloud firewall running on a first cloud in a first cloud region, wherein the first cloud region is one of a plurality of cloud regions provided by a cloud service provider;
   evaluating values of the usage metrics against criteria for scaling cloud firewalls;
   based on determining that a first value satisfies a first of the criteria, determining if the first value is attributable to users in closer geographic proximity to another of the plurality of cloud regions than to the first cloud region, wherein the first criterion is a criterion to scale firewalls up into another cloud region in which no cloud firewalls are available;
   based on determining that the first value is attributable to users in closer geographic proximity to another of the plurality of cloud regions, selecting a second of the plurality of cloud regions based on geographic locations of the users, wherein the second cloud region has no cloud firewalls available; and
   deploying a second cloud firewall to a second cloud environment in the second cloud region.

2. The method of claim 1 further comprising making the second cloud firewall available to the users.

3. The method of claim 2, wherein making the second cloud firewall available to the users comprises inserting indications of a domain name assigned to the second cloud and a network address associated with the second cloud into a Domain Name System (DNS) server.

4. The method of claim 1 further comprising:
   determining if a second value of the usage metrics satisfies a second of the criteria for scaling cloud firewalls, wherein the second criterion is a criterion to scale cloud firewalls in the first cloud region down to zero; and
   based on determining that the second value satisfies the second criterion, terminating execution of the first cloud firewall.

5. The method of claim 4, wherein determining if the second value satisfies the second criterion comprises determining if the second value is below a threshold and determining if another of the plurality of cloud regions different from the first cloud region has one or more cloud firewalls available.

6. The method of claim 4 further comprising, based on determining that the second value satisfies the second criterion, submitting a request to a Domain Name System (DNS) server to update an entry corresponding to a domain name assigned to the first cloud with a network address of the second cloud, wherein the update replaces a network address of the first cloud with the network address of the second cloud.

7. The method of claim 1, wherein selecting the second cloud region comprises:
   determining which of the plurality of cloud regions having no firewalls available is nearest to geographic locations of the users; and
   based on determining that the second cloud region is nearest to the geographic locations of the users, selecting the second cloud region.

8. The method of claim 1, wherein collecting the usage metrics comprises collecting usage metrics corresponding to at least one of a number of users associated with the first cloud, a cloud bandwidth associated with the first cloud, and central processing unit (CPU) utilization associated with the first cloud, and wherein the first value comprises a number of users, a measured CPU utilization, or a measured cloud bandwidth.

9. The method of claim 1, wherein the first criterion comprises a threshold for usage metric values having a same type as the first value, and wherein determining if the first value satisfies the first criterion comprises determining if the first value satisfies the threshold.

10. One or more non-transitory machine-readable media having program code stored thereon that is executable by a computing device, the program code comprising instructions to:
    evaluate values of usage metrics collected for a first cloud firewall against criteria for scaling cloud firewalls, wherein the first cloud firewall runs in a first cloud offered in one of a plurality of cloud regions;
    determine whether a first of the values satisfies a first of the criteria to make available cloud firewalls in another of the plurality of cloud regions in which no cloud firewalls are deployed based on geographic locations of users to which the first value is attributable;
    based on a determination that the first value satisfies the first criterion, select an additional cloud region of the plurality of cloud regions, wherein the selection is based on the geographic locations of the users;
    deploy a second cloud firewall in a second cloud offered in the additional cloud region; and
    indicate to the users to which the first value is attributable that that the second cloud firewall is available.

11. The non-transitory machine-readable media of claim 10 further comprising instructions to determine the geographic locations of the users to which the first value is attributable, wherein each of the geographic locations comprise, for each user, a corresponding one of the plurality of cloud regions that is in closest geographic proximity to the user.

12. The non-transitory machine-readable media of claim 11,
    wherein the instructions to determine whether the first value satisfies the first criterion comprise instructions to determine whether a first subset of the users are in a geographic location that is different from the cloud region in which the first cloud firewall runs and to determine whether a number of the first subset of the users satisfies a first threshold, and wherein the instructions to determine that the first value satisfies the first criterion comprise instructions to determine that the number the first subset of the users satisfies the first threshold.

13. The non-transitory machine-readable media of claim 12, wherein the instructions to select the additional region based on the geographic locations of the users comprise instructions to select one of the plurality of cloud regions that corresponds to the geographic location of the subset of the users.

14. The non-transitory machine-readable media of claim 10, further comprising instructions to:

determine whether a second of the values satisfies a second of the criteria, the second criterion being a criterion to scale cloud firewalls in the cloud region down to zero; and based on a determination that the second value satisfies the second criterion, terminate execution of the first cloud firewall.

15. The non-transitory machine-readable media of claim 14, wherein the instructions to determine whether the second value satisfies the second criterion comprise instructions to determine whether the second value is below a threshold and whether another of the plurality of cloud regions different from the cloud region has a cloud firewall available.

16. An apparatus comprising:

a processor; and a computer-readable medium having instructions stored thereon that are executable by the processor to cause the apparatus to:

obtain usage metrics associated with a first cloud firewall running on a first cloud in a first cloud region of a plurality of cloud regions provided by a cloud service provider;

determine if a first value of the usage metrics is attributable to users in closer geographic proximity to another of the plurality of cloud regions than to the first cloud region and satisfies a first criterion, wherein the first criterion is a criterion to scale cloud firewalls up into another cloud region in which no cloud firewalls are available;

based on a determination that the first value satisfies the first criterion, select a second cloud region of the plurality of cloud regions based on locations of the users in closer geographic proximity to another of the plurality of cloud regions than to the first cloud region, wherein the second cloud region has no cloud firewalls available; and deploy a second cloud firewall to a second cloud in the second cloud region.

17. The apparatus of claim 16 further comprising instructions executable by the processor to cause the apparatus to make the second cloud firewall available to the users in closer geographic proximity to another of the plurality of cloud regions than to the first cloud region based on insertion of indications of a domain name and a network address associated with the second cloud into a Domain Name System (DNS) server.

18. The apparatus of claim 16, wherein the instructions executable by the processor to cause the apparatus to select the second cloud region comprise instructions executable by the processor to cause the apparatus to:

determine which of the plurality of cloud regions having no firewalls available is nearest to locations of the users in closer geographic proximity to another of the plurality of cloud regions than to the first cloud region based on monitored source regions of the users; and based on a determination that the second cloud region is nearest to the locations of the users, select the second cloud region.

19. The apparatus of claim 16 further comprising instructions executable by the processor to cause the apparatus to:

determine if a second value of the usage metrics satisfies a second criterion for scaling cloud firewalls, wherein the second criterion is a criterion to scale cloud firewalls in the first cloud region down to zero; and based on a determination that the second value satisfies the second criterion, terminate execution of the first cloud firewall.

20. The apparatus of claim 19, wherein the instructions executable by the processor to cause the apparatus to determine if the second value satisfies the second criterion comprise instructions executable by the processor to cause the apparatus to determine if the second value is below a threshold and to determine if another of the plurality of cloud regions different from the first cloud region has one or more cloud firewalls available.

* * * * *